Oct. 14, 1958     H. O. SCHJOLIN     2,856,049

CLUTCH PLATE

Filed April 26, 1954

INVENTOR
Hans O. Schjolin
BY L. D. Burch
ATTORNEY

United States Patent Office 2,856,049
Patented Oct. 14, 1958

2,856,049

CLUTCH PLATE

Hans O. Schjolin, Birmingham, Mich., assignor to General Motors Corporation, Detroit, Mich., a corporation of Delaware Application April 26, 1954, Serial No. 425,541

5 Claims. (Cl. 192—107)

This invention relates to friction discs or plates generally and more particularly to driven friction discs such as are used in clutch and brake assemblies.

In clutch assemblies of the friction disc type it is desirable that the torque transmitting friction discs be responsive for immediate disengagement from the drive or pressure plate with which they are normally engaged. Slow release of a friction disc in clutch assemblies causes what is commonly referred to as clutch plate drag and results in the dissipation of heat, wearing away of the friction material, and an overall reduction in clutch efficiency. The effects of clutch plate drag are most apparent in multiple disc type clutches where the adverse effects are multiplied by the member of friction discs employed. The use of waved, dished or otherwise deformed friction discs have not proven entirely satisfactory; nor have multiple coil or other spring members for urging the friction disc or plate out of engagement with adjacent clutch members. Still other means which have been used have proven either too expensive or too effective in that the friction disc in re-engaging the drive or pressure plate is caused to grab, thereby preventing smooth operation of the clutch assembly.

It is now proposed to provide a clutch plate or friction disc for use in clutch or brake assemblies which includes means for effecting a quick release of the plate without drag and such as will enable re-engagement with associated members without plate grab. The proposed clutch plate includes a plurality of substantially radially extended spring fingers circumferentially spaced about the clutch plate and having buttons secured to the outer ends thereof. The thickness of the buttons is slightly greater than the thickness of the friction facing on the side of the plate towards which the button is extended thereby enabling the button to hold off the friction facing from adjacent members but to yield readily when engagement is desirable.

It is an object of this invention to provide quick release of a friction disc from members adjacent thereto when such disc is disengaged. It is also an object of this invention to provide a friction disc which is adapted to readily engage an associated member without grabbing or other erratic action but in a responsive and smooth manner. It is further an object of this invention to provide a friction disc for use in wet disc type clutches which is adapted to break the fluid cohesion tending to hold the disc in engagement with associated members and preventing quick release of such friction discs. It is a still further object of this invention to provide a friction disc which is simple in construction and inexpensive to manufacture and assemble.

Figure 1:
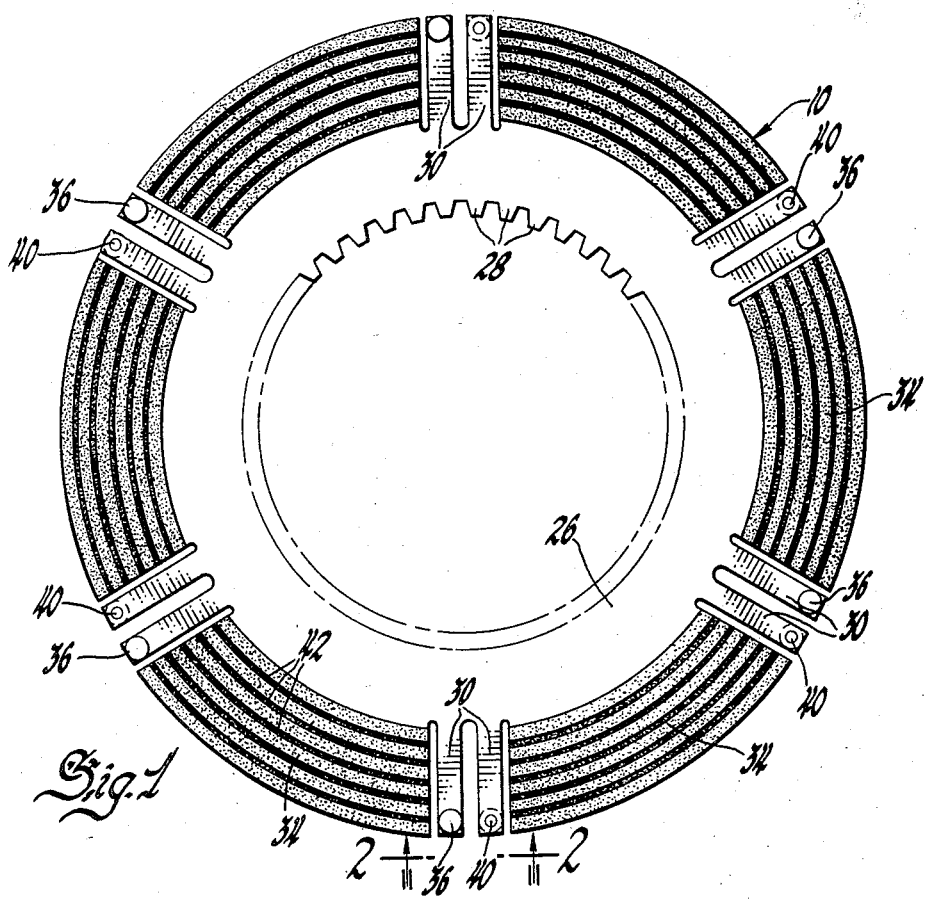
Figure 1 is a side elevation of the proposed clutch plate.
Figure 2:
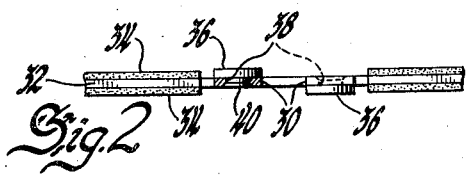
Figure 2 is an enlarged view of a part of the proposed clutch plate looking in the direction of the arrows on Figure 1.
Figure 3:
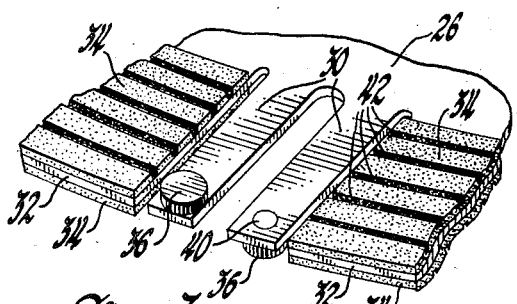
Figure 3 is an isometric view of a fragmentary portion of the proposed clutch plate.
Figure 4:
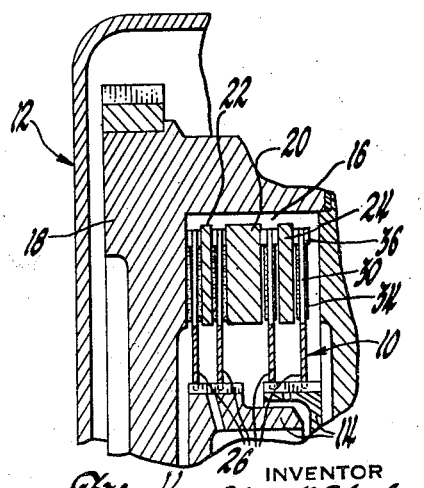
Figure 4 is a cross sectioned view of a part of a multiple disc type clutch assembly showing the proposed clutch plates employed therewith.

The present embodiment of the proposed clutch plate 10 is particularly for use with a wet multiple disc clutch assembly 12 and is shown so employed in Figure 4. The clutch plates 10 when engaged by flywheel 18 are adapted to drive gears 14. The clutch plates 10 and gears 14 are disposed within a chamber 16 through which a lubricating and cooling fluid is circulated. The clutch plates 10 are transversely movable to effect engagement with the clutch drum 18 by means of a pressure plate 20 and floating spacers 22 and 24 in a well known and conventional manner.

The clutch plates 10 each comprise an annular disc or plate 26 having gear-like teeth 28 formed about its inner periphery which teeth are adapted to be engaged by the drive gears 14. The disc 26 is relieved at spaced intervals about its outer periphery to form a plurality of spaced and substantially radially extended spring fingers 30. In the present instance two such spring fingers are formed intermediate each annular sector 32 whereon the friction material 34 is provided.

Each spring finger 30 has a button 36 secured at its outer end and extended on one side thereof. A small hole 38 is formed in the outer end of each spring finger 30 to receive the depending nub 40 formed on the underside of each button 36. The nub 40 is counter sunk within the side of the spring finger 30 opposite the button 36 to provide a flush surface thereon. Each button 36 is of a thickness only slightly greater than the thickness of the friction material 34 on the side of the plate 26 which it faces.

The outwardly extended spring fingers 30 are of a length adapted to provide the necessary flexibility allowing deflection of the spring finger with but minimum effort when the friction facings 34 of the clutch plate 10 are to be engaged and yet such as will have sufficient rigidity to urge the plate out of engagement when the clutch plate is released.

The spring fingers 30 are not truly radial in the present instance with respect to the axis of the clutch plate 10 but are more chordally disposed; though each pair of spring fingers are parallel to the axis of the clutch plate. The adjacent spring fingers 30 in the present embodiment are parallel to one another and are spaced apart. Of each pair of spring fingers 30 one has a button 36 disposed on one side thereof and the other a button 36 disposed on the opposite side thereof. The buttons 36 on substantially diametrically opposite sides of the clutch plate 10 are chordally aligned on one side of the axis of the clutch plate 10. The alignment of the spring fingers 30 not being through the axis of rotation but to one side thereof the release pressure exerted by the spring fingers 30 in disengaging the clutch plate 10 will be distributed to one half of the plate more than the other. Since there are a plurality of opposite pairs of spring fingers 30 the resultant effect is a greater backing off effort upon the clutch plate than where truly radially disposed. This arrangment also enhances the effort which is needed to break the cohesive fluid film tending to retard movement of the clutch plate 10 where such plates are used in the wet disc type clutch assembly.

The friction material 34 which is provided on opposite faces of the disc 26 may be of any conventional adaptable material. Such material 34 is formed in annular segments and is secured to the annular portions 32 of the clutch plate 10 intermediate the circumferentially disposed pairs of spring fingers 30. Inasmuch as the present embodiment is of a clutch plate adaptable for use with a wet type multiple disc clutch the friction material 34 is shown to include annular grooves 42 formed therein. The grooves 42 assist in carrying away fluid from the friction faces which would otherwise tend to hold the clutch plates 10 to members adjacent thereto by fluid cohesion.

The operation of the clutch plate 10 within a wet multiple disc type clutch assembly 12 is as follows. The clutch plates 10 are disposed upon drive gears 14 with the teeth 28 engaged therewith and are alternately positioned between a clutch drum 18, floating spacers 22 and 24 and pressure plate 20 and within a closed fluid chamber 16. The buttons 36 of the spring fingers 30 extend beyond the face of the friction material 34 on each side of the clutch plates and normally hold the friction material 34 out of engagement with the members disposed adjacent thereto. Upon movement of the pressure plate 20 towards the clutch drum 18 the spring finger 30 of the clutch plates 10 disposed between the pressure plate 20, spacer 22, and clutch drum 18 are displaced inwardly of the clutch plate allowing the engagement of such members with the friction facings 34 of the intermediate clutch plates. The moment the pressure plate 20 is released the spring fingers 30 regain their former position and the outwardly projecting buttons 36 assist in backing off the clutch plates 10. Such action is immediately responsive to a release of the pressure plate 20. The rapid response of the spring fingers 30, fluid wiping of the buttons 36, and the prompt break of the fluid film all contribute to assure rapid release and minimum clutch plate drag.

I claim:

1. A clutch plate comprising a disc having a plurality of sectoral friction elements secured circumferentially therearound and disposed on both sides thereof, said disc being peripherally slotted intermediate adjacent friction elements to provide spring fingers therebetween, means secured to the outer ends of said spring fingers and extended axially beyond the face of said friction elements for holding off said disc from an adjacently disposed member, said fingers being readily deflected inwardly of said disc for allowing engagement of said friction elements with said adjacently disposed member.

2. A clutch plate comprising a disc having a plurality of sectoral friction elements secured circumferentially therearound and disposed on both sides thereof, said disc being peripherally slotted intermediate adjacent friction elements to provide spring fingers therebetween, means secured to the outer ends of said spring fingers and extended axially beyond the face of said friction elements on one side thereof for holding off said disc from adjacently disposed members, said fingers being readily deflected inwardly of said disc for allowing engagement of said friction elements with said adjacently disposed members.

3. A clutch plate including an annular disc having a plurality of sectoral friction elements secured thereto, said friction elements being secured in spaced relation to each other and on each side of said plate, a plurality of radially extending spring fingers formed from said plate intermediate said friction elements, an outwardly projecting button member secured to each of said spring fingers on one side thereof, said button members intermediate each friction element extending outwardly beyond opposite faces of said friction disc, said buttons being readily deflected inwardly of said friction elements upon engagement of said disc with an associated member.

4. A clutch plate comprising a disc having a plurality of sectoral friction elements secured circumferentially thereto and disposed on both sides thereof, said disc being peripherally slotted at spaced intervals to provide a plurality of spring fingers, said fingers being disposed in parallel pairs intermediate said friction elements, button members secured to said spring finger on one side thereof and extended outwardly beyond the face of said friction elements, said button members of adjacent parallel fingers being oppositely disposed outwardly of said disc for resiliently holding off said disc from members disposed adjacent thereto, said fingers being readily deflected out of the plane of said disc for withdrawing said buttons and enabling engagement of said friction elements with said members disposed adjacent thereto.

5. A clutch plate including a disc having sectoral friction elements secured on opposite sides thereof and circumferentially spaced therearound, a plurality of spring fingers formed from said disc intermediate adjacent friction elements, said fingers extending radially outward and being disposed in parallel pairs symmetrical with the radius of said disc, and means secured to the outer ends of said spring fingers and extended outwardly on one side thereof beyond the face of said friction elements for resiliently holding off said disc from adjacently disposed members adapted to be engaged therewith, said fingers yielding to pressure applied to effect engagement of said disc with said members for moving said means inwardly of the face of said friction elements.

References Cited in the file of this patent

UNITED STATES PATENTS

| | | |
|---|---|---|
| 1,479,973 | Sturt et al. | Jan. 8, 1924 |
| 1,492,862 | Smith | May 6, 1924 |
| 1,810,360 | Loeffler | June 16, 1931 |
| 1,934,109 | Wemp | Nov. 7, 1933 |
| 2,038,016 | Wemp | Apr. 21, 1936 |
| 2,175,418 | Wales | Oct. 10, 1939 |
| 2,299,028 | Nutt et al. | Oct. 13, 1942 |

FOREIGN PATENTS

| | | |
|---|---|---|
| 269,696 | Great Britain | Apr. 28, 1927 |